H. KITCHER.
WHEEL AND TIRE THEREFOR.
APPLICATION FILED OCT. 20, 1913.

1,113,356.

Patented Oct. 13, 1914.
2 SHEETS—SHEET 1.

Witnesses.
Olive M. Birkinshaw
A. M. Wylie

Inventor.
H. Kitcher
by Egerton R. Case
Atty.

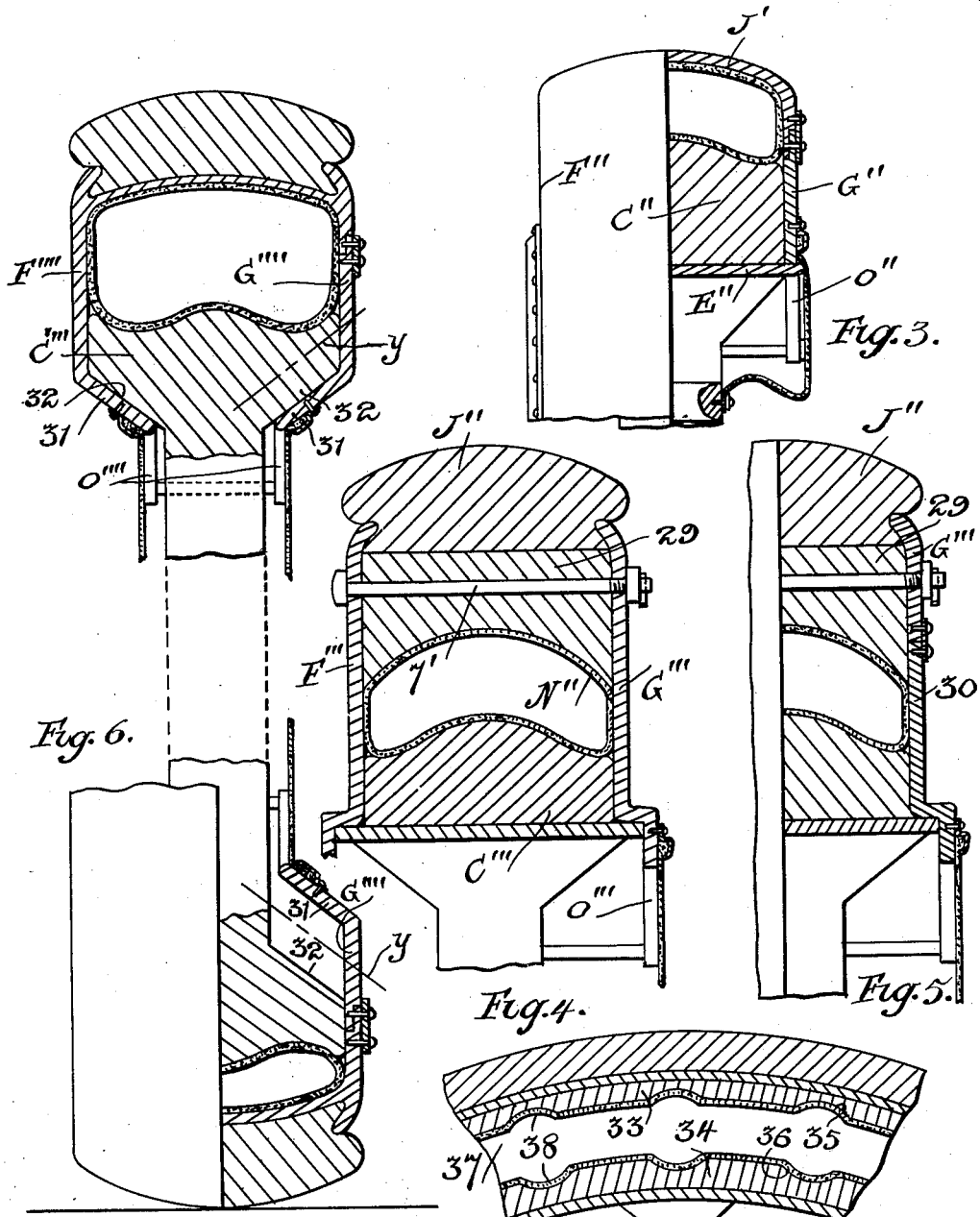

UNITED STATES PATENT OFFICE.

HENRY KITCHER, OF TORONTO, ONTARIO, CANADA.

WHEEL AND TIRE THEREFOR.

1,113,356.  Specification of Letters Patent.  Patented Oct. 13, 1914.

Application filed October 20, 1913. Serial No. 796,335.

*To all whom it may concern:*

Be it known that I, HENRY KITCHER, of the city of Toronto, county of York, Province of Ontario, Canada, a subject of the King of Great Britain, have invented certain new and useful Improvements in Wheels and Tires Therefor, of which the following is a specification.

My invention relates to improvements in wheels and tires therefor, and one of the objects of my invention is to provide a wheel which will float, so to speak, on a body of compressed air interposed between the felly of the wheel and the tread of the tire, and in such a manner as to absolutely prevent any possibility of the puncturing of the tube containing the air and at the same time to provide a tire which will be as resilient and flexible as an ordinary pneumatic tire.

A still further object of my invention is to provide particular means to laterally support the side plates of the tire and in such a manner as to provide for the freedom of movement of the wheel within the tire and yet prevent any possibility of the wheel pinching the inner tube.

A still further object of my invention is to incase the inner tube in a suitable flexible envelop so that there will be a substantially uniform air pressure within said air tube irrespective of the load the wheel carries, and the construction of my invention, in various forms, will be hereinafter set forth, and what I claim as new will be pointed out in the claims forming part of this specification.

Figure 1:
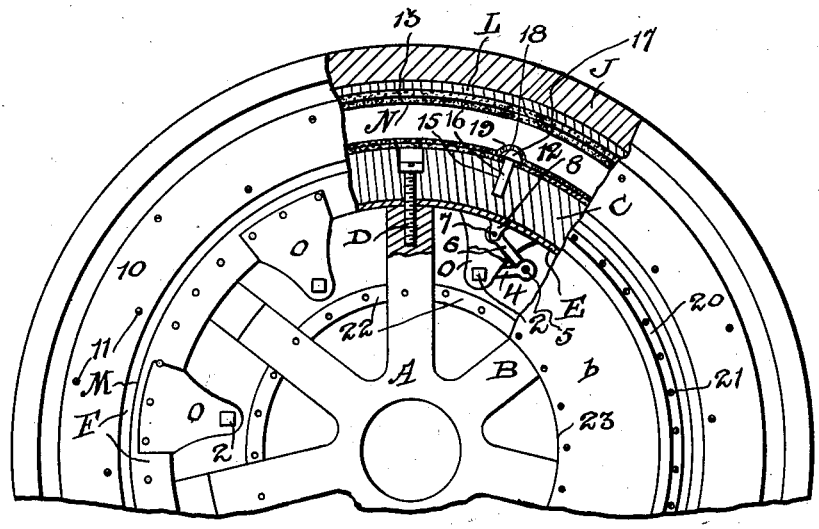
Figure 2:
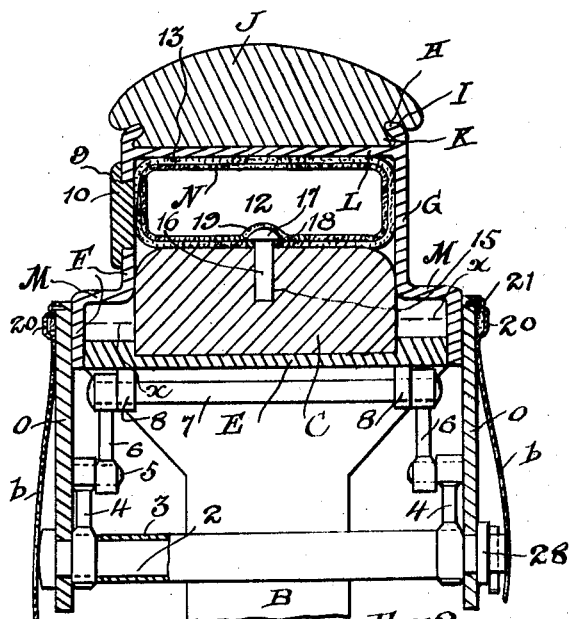

Figure 1, is a side elevation of portion of my wheel and tire, certain parts being broken away and shown in section to illustrate internal construction. Fig. 2 is a cross section through the wheel and tire illustrated in Fig. 1. Figs. 3, 4, 5, and 6 are cross sections through my wheel and tire, showing various constructions thereof; and Fig. 7 is a longitudinal vertical section through portion of my wheel and tire showing means to prevent the shifting of the air tube.

In the drawings, like characters of reference indicate corresponding parts in each figure.

A is any suitable wheel and C the felly which is secured by any suitable means to the spokes B, as for instance by means of the screws D. To strengthen the felly and also the wheel, and to perform the function hereinafter mentioned, a metal ring plate E is positioned within the felly as illustrated, and against the same, and the screws D or equivalent means, hold the said ring plate in place. Positioned at each side of the felly C are plates F and G, the outer portions of which terminate in inturned beads H which interfit with annular grooves I formed in the tread J and at each side thereof. The beads H overhang the annular flanges K of the tread J, thus locking the said tread (which is made of suitable material such as a rubber compound) firmly in place. Uniting the plates F and G together near the beads H, and performing the function of a bed for the tread J, is a web-plate L. The plates F and G are provided with out-turned substantially horizontal flanges M, positioned near the inner portions of the plates, thus widening the distance between the said plates at their inner ends. The ring plate E and plates F and G are free to have relative movement, under normal conditions. The ring plate E will be moved with the wheel A under the weight of the load, and the outer sides of said plate will come into contact with the inner sides of the flanges M, thus preventing the pinching of the air tube N between the web plate L and the felly C. In all forms of my invention it is important that the relative movements of the felly of the wheel and the plate F and G, be limited, to absolutely prevent the pinching of the air tube.

In order to couple the inner sides of the plates F and G together to prevent the spreading of the same, I prefer to use the following means. Secured to the said plates, or formed a part thereof, are flange plates O which extend radially inwardly. Mounted in the inner ends of the flange plates, which are positioned in pairs, are tie bolts 2, suitably held therein, as, for instance, according to the well known construction illustrated in Fig. 2. Mounted on each of the said tie bolts is a sleeve 3, the ends of which rest against the inner sides of the flange plates O. The construction described, or its equivalent, provides means which prevent the spreading of the plates F and G and enable the tire to successfully withstand lateral strains.

In order to prevent substantially circumferential displacement between the wheel A and the plates F and G forming part of the tire, I prefer to use the following means which, while performing the said function, does not interfere with the resiliency of the wheel and tire. Loosely mounted on the sleeve 3, and one at each end thereof, are a pair of link arms 4, the inner ends of which are pivoted by pivots 5 to the link arms 6, which in turn are secured one at each end of the rod 7, journaled in the lugs 8, carried by the ring plate E. It may or may not be necessary to provide more than one set of the said link arms, as will be understood. The flange plates O will be sufficient in number to perform the function of preventing the spreading of the plates F and G.

One important feature in my invention is the fact that the air tube may be readily positioned and removed without the necessity of having to dismantle the wheel for that purpose. In my preferred form of construction illustrated in Figs. 1 and 2, the plate F is provided with a side opening 9, for its whole circumferential distance. This side opening leads directly into the air tube chamber 12. The construction thus described adds greatly to the utility of my tire.

I prefer to place within the air tube chamber 12, a flexible envelop or casing 13, which is designed to contain the air tube N. The said envelop or casing 13 will be made substantially of the same material composing the ordinary envelop or casing for tires, and one of its functions is to provide means whereby the axes of rotation of the wheel A and tire will be substantially the same. It will be understood that the wheel A "floats" within the tire already described, and not having the air tube N within the casing 13, under a load the lower part of the said wheel will compress the air tube N with the result that the axis of rotation of the said wheel will be considerably below the axis of rotation of the tire. The result will be that a greater volume of compressed air will be at the top of the tire than at the bottom, thus considerably reducing the resilient range of movement of the wheel A. Now within the envelop or casing 13, the air tube N is prevented from enlargement at the top of the tire especially, consequently the distance separating the parts, for instance the ring plate E and the flanges M, will be greater than if no casing be employed. In other words, the axes of rotation of the wheel A and the tire will be substantially the same, and, therefore, when the tire meets with any inequality in the roadway there will be a greater distance for the plate E to move before it strikes the flanges M. It will be apparent now that the envelop or casing 13 will hold the wheel A and tire in such relationship that the maximum resiliency will be had from the use of my tire and wheel under varying loads. While the use of the casing 13 is preferable, still it is not absolutely essential. Of course in order to insert the air tube N within the envelop or casing 13, the side of the said envelop or casing next the plate 10 will be provided with an opening, which is to be laced, as will be understood.

In order to prevent material circumferential and rotary transverse movement of the air tube N, I prefer to use the following means: Formed in the felly C are pockets 15. The said pockets each receive a stud 16, the rounded heads 17 of which extend into said chamber 12. The said envelop or casing 13 is provided with a plurality of eyelet provided holes 18, and in order to prevent the described movements of said envelop or casing, the said studs 16 pass through the said holes 18, as illustrated in Figs. 1 and 2. The fact that the rounded heads 17 project into the air tube chamber 12, will cause the formation of a plurality of beads 19 within the air tube N. The said beads will be of the desired number, and by reason of the same the air tube N will be materially held from having the movements described.

In order to prevent the passage of dust between the ring plate E and the plates F and G, I provide a suitable housing for the inner periphery of the wheel A. My preferred construction comprises flexible aprons b the outer edges of which are secured to each side of the wheel by clamping plates 20, suitably removably held in place, as by means of the screws 21. Supported between each pair of spokes B is a rib 22, preferably of the same width as said spokes, and to these ribs the inner ends 23 of the said aprons are suitably secured. The said aprons are flexible and allow for the freedom of movement of the wheel, and also prevent dust and mud having access to the link arms 4 and 6 and their supporting parts.

In the form of my invention illustrated in Fig. 3, I dispense with the tread J, and in place thereof use the metal tread J', which is integrally formed with the plate F''. The plate G'' is suitably secured in place. The ring plate E'', except where the flange plates O'' are positioned, overlaps the plates F'' and G'', and the contacting of this said ring plate with the said other plates, limits the movement of the felly C'' and prevents pinching of the air tube.

In the forms of my invention illustrated in Figs. 4 and 5, interposed between the tread J'', is an annular tread bed 29, which takes the place of the web plate L. The plates F''' and G''' are constructed substantially identical to the plates F and G, except that they are not connected together permanently. The outer ends of the said 13 plates F''' and G''' are held in relationship by means of tie rods 7' which pass through the tread bed 29. These said plates are also provided with the flange plates O''' removably connected together as before described. In order to remove the air tube N'' it is only necessary to unfasten the attachments illustrated particularly in Figs. 2 and 4 and remove the plate G'''. The plate G''' (Fig. 5) is provided with a removable section 30 similar in construction to the plate G'' (Fig. 3) so far as regards the means whereby the said removable section may be positioned and removed.

In Figs. 3, 4 and 5, the air tubes are all shown under compression and the metal ring plates are in contact with their associated plates for limiting their outward movements.

In the form of my invention illustrated in Fig. 6, the plates F'''' and G'''' are so constructed that the inner portions 31 of said plates converge. The inner outer sides 32 of the felly C'''' are constructed at converging angles, and under a load, the said sides 32 abut against the inner portion 31 of the said plates, thus preventing the felly in this form of my invention from pinching the air tube. In this form of my invention also I use the flange plates O'''' and their connecting parts.

In Fig. 7 I show the tread bed 33, and the felly 34 provided in opposing surfaces with depressions 35 and 36, into which portions of the air tube 37 are forced thus forming beads 38 which perform the functions already described in connection with the beads 19.

From the foregoing specification it will be evident that I have disclosed a very efficient wheel and tire, that will be serviceable under all conditions. The majority of the parts will be made of material that will last practically indefinitely, thereby greatly reducing the cost of maintenance of motor vehicles particularly.

In order to reduce the weight as much as possible, the felly may be made of suitable wood, such as ash or oak.

I may position the tie bolts 2 close enough to the metal ring plate E so that the said tie bolts will form stops to limit the movement of said ring plate and the felly C to prevent the pinching of the air tube.

The broken lines x and y, in Figs. 2 and 6 respectively indicate approximately the distance separating the metal plate E and the flanges M and the portions 31 of the plates F'''' and G'''' and the inner outer sides 32 of the felly C'''' respectively, when the casing 13, is employed and the wheel A is supporting a load.

While I have described what I consider to be the best embodiments of my invention I desire it to be understood that the principles can be embodied in different forms and I desire not to be limited beyond the requirements of the prior art and the terms of my claims.

What I claim as my invention is:

1. In a wheel and tire therefor, the combination with the felly; a pair of coupled plates between which said felly has radial movement; a tread associated with the said plates; an air tube positioned between said plates and said felly and said tread; means whereby the movement of said wheel is limited to prevent said felly from pinching said air tube; means whereby said air tube may be positioned and removed; means for preventing substantially circumferential displacement between said plates and said felly comprising a plurality of alined pairs of link members pivoted together at each side of the wheel and positioned between the spokes of the wheel and between said felly and the hub of the wheel; means for pivoting the outer ends of said coupled link members to the inner portion of said felly; a plurality of pairs of flange plates secured to said coupled plates and radially disposed between said spokes; the said link members being positioned between said flange plates, and means coupling the inner ends of each pair of said flange plates together and to which the inner ends of each pair of link members are pivoted, as set forth.

2. In a wheel and tire therefor, the combination with the felly; a metal ring-plate secured against the inner periphery of said felly; a pair of coupled plates between which said felly has radial movement; a tread associated with the said plates; an air tube positioned between said plates and said felly and said tread; the said ring-plate abutting against the said plates to limit the outward movement of said felly to prevent the pinching of the air tube; means whereby said air tube may be positioned and removed; means for preventing substantially circumferential displacements between said plates and said felly comprising a plurality of alined pairs of link members pivoted together at each side of the wheel and positioned between the spokes of the wheel and between said felly and the hub of the wheel; means for pivoting the outer ends of said coupled link members to the said metal ring plate; a plurality of pairs of flange plates secured to said coupled plates and radially disposed between said spokes; the said link members being positioned between said flange plates, and means coupling the inner ends of each pair of said flange plates together and to which the inner ends of each of the link members are pivoted, as set forth.

3. In a wheel and tire therefor, the combination with the felly; a pair of plates between which said felly has radial movement; a tread associated with said plates; a flexible envelop positioned between said plates and said felly and said tread, and provided with a plurality of holes; studs supported one in each of the said holes and extending into pockets formed in the said felly, the inner ends of said studs being rounded and projecting within the said envelop; an air tube within said envelop; heads of the said studs forming beads within said air tube to keep the same against movement; means whereby the movement of said wheel is limited to prevent said felly pinching said air tube, and means whereby said envelop and air tube may be positioned and removed.

4. In a wheel and tire therefor, the combination with the felly; a pair of plates between which said felly has radial movement; a tread associated with said plates; a flexible envelop positioned between said plates and said felly and said tread, and provided with a plurality of holes; studs supported one in each of the said holes and extending into pockets formed in the said felly, the inner ends of the said studs being rounded and projecting within the said envelop; the heads of the said studs forming beads within said air tube to keep the same against movement; means whereby the movement of said wheel is limited to prevent said felly pinching said air tube, and an annular plate closing a side opening formed in one of said plates through which said envelop and air tube are positioned and removed.

5. In a wheel and tire therefor, the combination with the felly; a pair of plates between which said felly has radial movement; a web plate permanently connecting said plates together at their outer ends; a tread carried by said plates and positioned against said web plate; an air tube positioned between said plates and said felly and said tread; the inner sides of said plates being offset outwardly to form horizontal flanges; a ring plate secured against the inner periphery of said felly and operating between the inner portions of said plates and designed to abut against said flanges to limit the radial downward movement of said felly to prevent the pinching of said air tube; an annular plate designed to close a side opening formed in one of said plates to permit of the placing and removing of said air tube; a plurality of flange plates carried by said plates and extending radially inward; tie bolts connecting said flange plates together, and link arms associated with the said bolts and said ring plate as set forth.

In testimony whereof I have affixed my signature in presence of two witnesses.

HENRY KITCHER.

Witnesses:
EGERTON R. CASE,
OLIVE M. BURKINSHAW.